INVENTORS
LEON HELLMANN
DONALD TEMPLE

BY *Mason, Mason & Albright*

ATTORNEYS

INVENTORS
LEON HELLMANN
DONALD TEMPLE

ATTORNEYS.

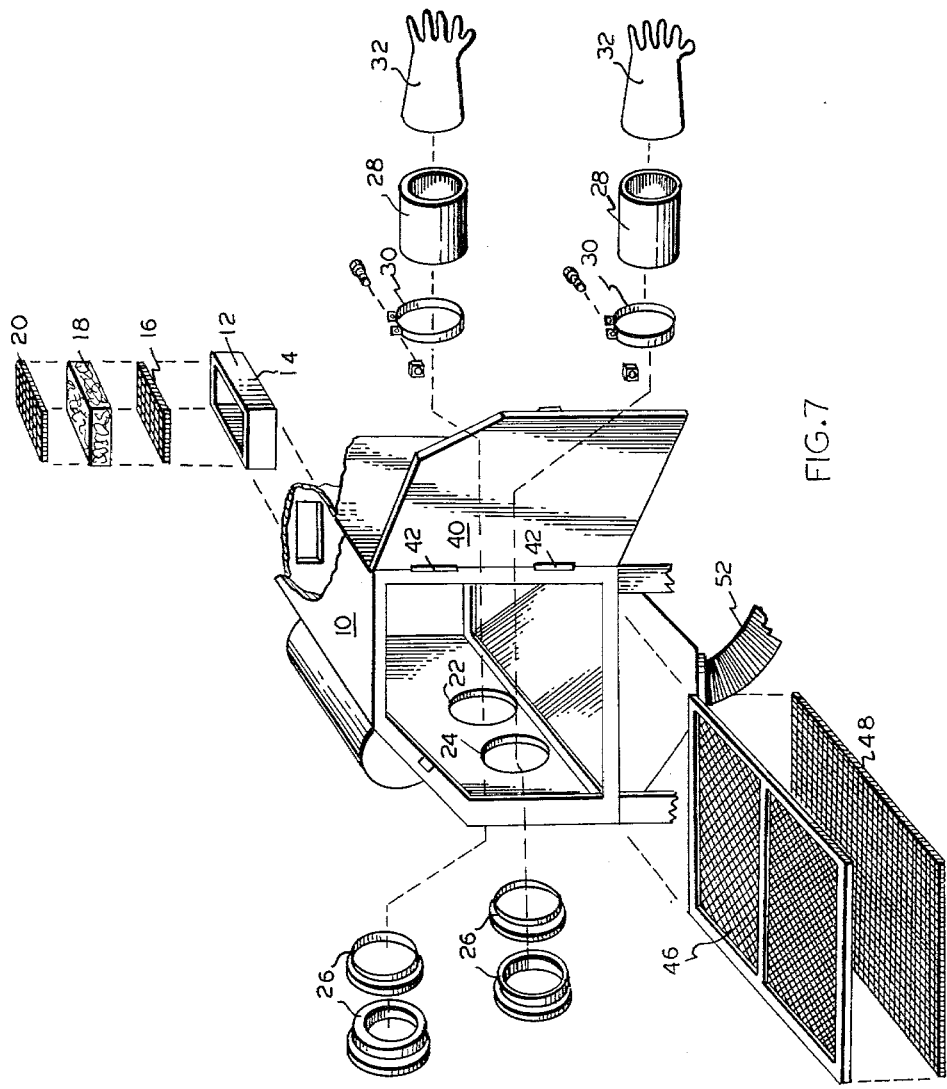

Aug. 10, 1965   L. HELLMANN ETAL   3,199,171
GLASS BALL PEENING MACHINE FOR TREATING SMALL ARTICLES
Filed Aug. 14, 1962   4 Sheets-Sheet 4

INVENTORS
LEON HELLMANN
DONALD TEMPLE
BY Mason, Mason & Albright
ATTORNEYS

United States Patent Office 3,199,171
Patented Aug. 10, 1965

3,199,171
GLASS BALL PEENING MACHINE FOR
TREATING SMALL ARTICLES
Leon Hellmann and Donald Lee Temple, Washington,
Mo., assignors to Zero Manufacturing Co., Washington, Mo., a corporation of Missouri
Filed Aug. 14, 1962, Ser. No. 216,849
9 Claims. (Cl. 29—90)

This invention relates to a machine for treating small metal articles held by the hand, to the action of a continuous blast on the surfaces to be treated, said blast carrying with it a large number of small diametered glass balls or beads. The blasting of glass beads against the metal surface produces a chemically pure, mat-satin finish while retaining close tolerances.

This finish differs under a microscope from polished, honed parts. The latter method leaves a scratched surface, whereas the product of this invention leaves a uniform surface, reduces friction, enhances lubrications, stress relieves and permit sealing in the finished product.

The size of the glass beads may be as small as 0.0005 inch in diameter, but a size bead of between 0.0015 inch in diameter to 0.0331 inch in diameter is the preferable range of sizes.

An object of the invention is to provide a compact machine for treating small articles, which articles may be held by the hand of the operator during treatment.

A further object is to provide a blasting cabinet having a recovery and reclaim system and a supply hopper whereby dry glass beads are withdrawn from the hopper by venturi action to the blasting gun within the cabinet.

A further object is to provide a blasting cabinet, having within the same a blasting nozzle for conveying glass beads under high pressure to an article held within the cabinet by the hands of the operator.

Another object is to include in the blasting cabinet means for admiting fresh air from the top of the cabinet to assist in collecting the beads within the cabinet, which beads pass through a mesh floor into the recovery tube located on the lower extremity of the cabinet.

Yet another object is to provide in the structure set out in the next preceding paragraph wherein air, after passing into the cabinet from the top, is carried into the recovery and reclaim unit which separates the glass beads from all foreign materials and from fractured beads.

A further object is to provide venturi means in the blast line, together with knee-control means for the blast gun.

Other objects will appear hereinafter throughout the specification.

FIGURE 7 is an exploded view of the principal parts of the cabinet;

Figure 1:
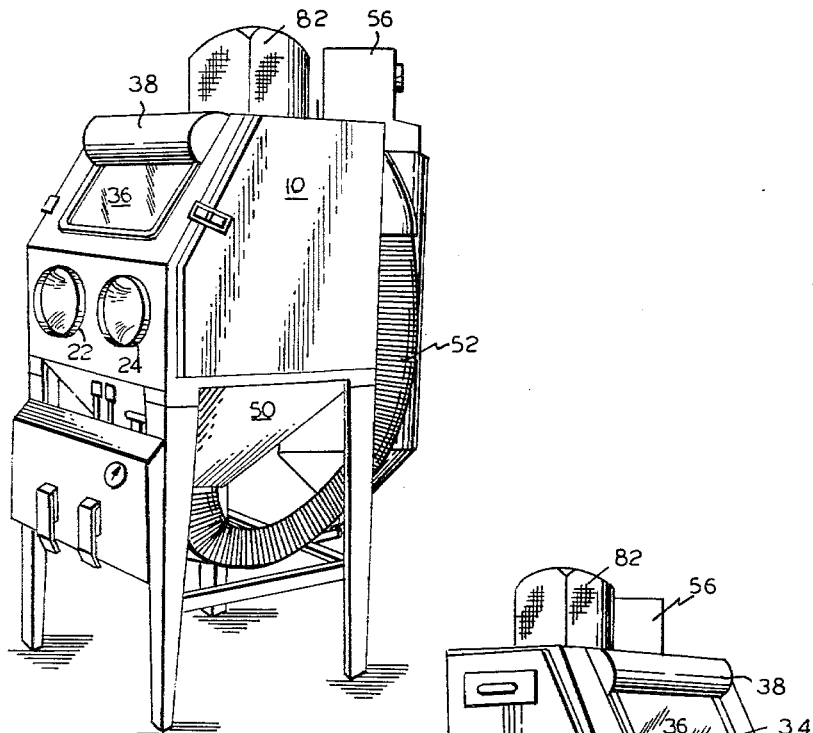
FIGURE 1 is a perspective view of the front and one side of the cabinet.

Referring now to the drawings, 10 shows the blasting cabinet. This cabinet is provided with a top inlet for air, consisting of a screen 12, as more particularly illustrated in FIGURE 7. This consists of a casing 14, a screen 16, a filter 18, and a second screen 20.

The front panel of the cabinet is provided with a pair of arm holes 22 and 24 for the insertion of sleeve members shown in FIGURE 7 and indicated by the rings 26, the sleeve members 28, clamps 30 and gloves 32.

There is an inclined panel 34 located above the front panel, which is provided with a window 36 and a fluorescent light 38. Pivoted sides 40 are adapted to be swung to closed position. They are hinged at 42 and latched in closed position by latches 44.

Figure 5:
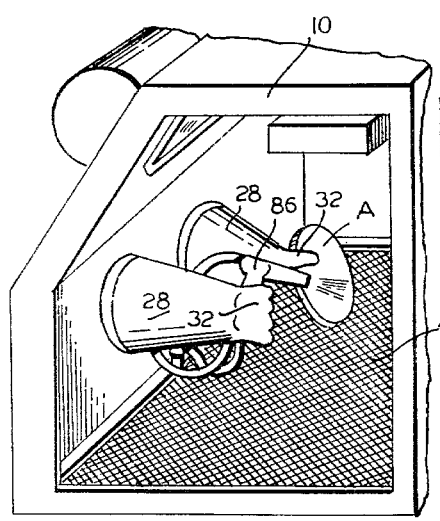
FIGURE 5 is a perspective view similar to FIGURE 4, showing the cabinet door in open position.

The bottom of the cabinet, particularly as seen in FIGURES 5 and 7, is provided with a pair of screens 46 and 48, which lie above each other. The former of these is of coarse structure wherein the wires extend diagonally of the frame in which they are mounted, whereas the latter consists of a fine screen, the meshes of which square in cross-section in a similar manner as the usual household fly screen.

Figure 3:
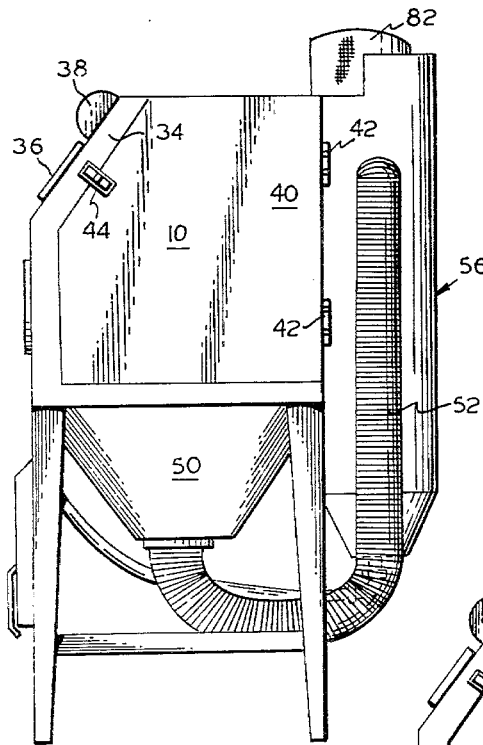
FIGURE 3 is a side elevational view showing the conduit means for conducting glass beads from the cabinet to the separator means.
Figure 6:
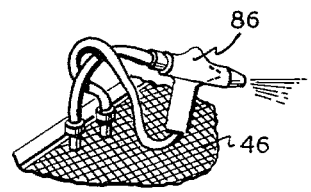
FIGURE 6 is a detail view partly broken away of the blasting gun and its mounting on the lower screen.
Figure 4:
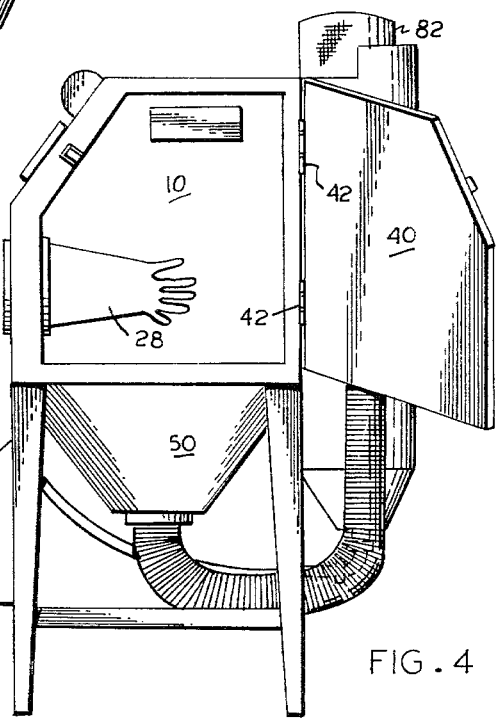
FIGURE 4 is a view similar to FIGURE 3, showing the cabinet door in open position.
Figure 8:
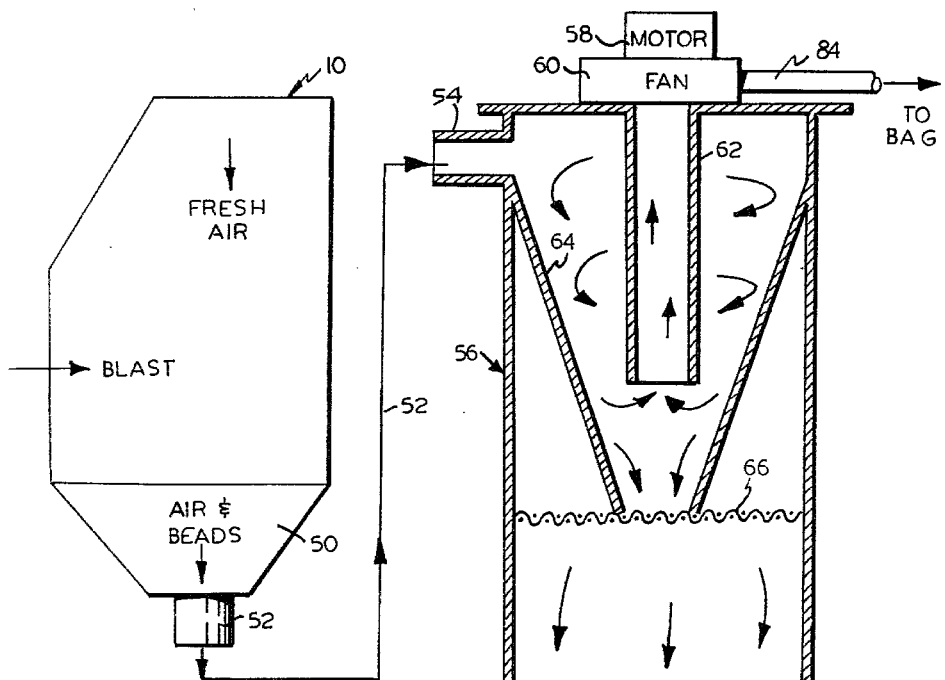
FIGURE 8 is a side elevational view of the cabinet and a vertical sectional view of the separator means.

As will be seen by referring to FIGURES 3, 4 and 8, the lower end 50 of the blasting cabinet 10 is funnel shaped. This forms the outlet for the expanded beads, including the broken beads and the whole beads which are to be separated from each other. Extending from the lower end 50 of the blasting cabinet is a conduit 52 which, as shown in the schematic view in FIGURE 8, leads to the inlet conduit 54 of the separator 56. This separator is provided with an electric motor, which is shown diagrammatically at 58, having a suitable switch for turning the motor on and off (not shown).

This electric motor drives the centrifugal fan 60, both motor and fan being located above the central axis of the separator.

Extending from the eye of the fan downwardly is a pipe 62, which is surrounded by a cone-shaped separator element 64. There is a screen 66 which extends across the mouth or converging end of the cone-shaped separator element 64. This screen extends transversely across the separator about midway thereof.

The base of the separator 56 is provided with converging sides 68 terminating in a fixture 70, to which there is attached the return duct 72. The hopper or bin has a connection (not shown) to the gun hereinafter to be described. Means for regulating the pressure within the separator is accomplished by a valve means 76, on which is mounted a cap 75, which is relatively rotatable in adjusted position whereby to adjust a series of different-sized openings 78, which are in communication with the atmosphere. Hand rotation of the cap 75 will result in aligning one of the different-sized openings 78 with the opening 80.

The rejects or broken beads and debris, such as rust and paint particles, which strike the screen 66 are pulled up through the pipe 62 and exhausted by centrifugal fan 60 through pipe 84 to the bag 82, which is similar to bags used in household vacuum cleaners. Other lighter constituents, which move downwardly against the cone-shaped separator element 64, are sucked directly upwardly by the centrifugal fan 60 before contacting the screen 66.

Figure 2:
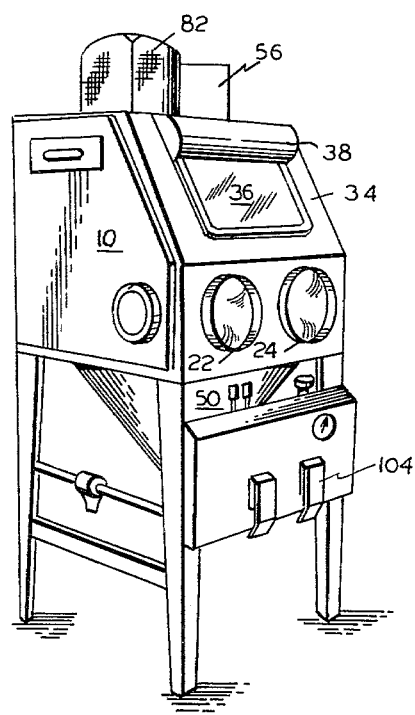
FIGURE 2 is a similar view of the front and the other side of the cabinet.
Figure 9:
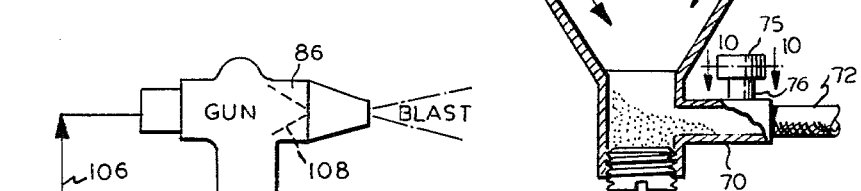
FIGURE 9 is a diagrammatic view, showing the blasting gun and parts pertinent thereto and the controls therefor.
Figure 10:
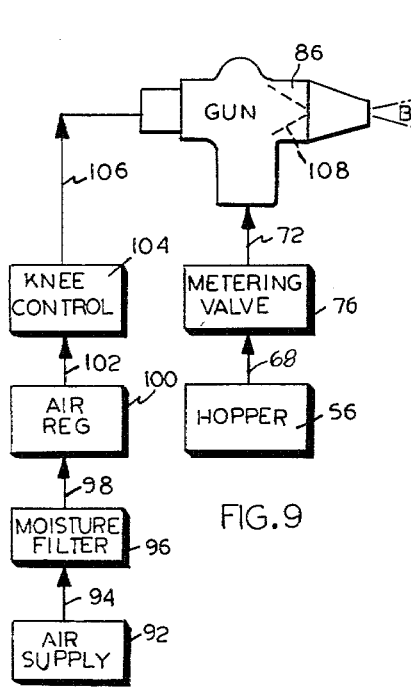
FIGURE 10 is a sectional view taken on the line 10—10 of FIGURE 9, showing an air valve regulator.

Referring now to FIGURES 2, 5 and 9, the blasting gun from which the beads issue at high speed is indicated by the reference numeral 86. The nozzle of the blasting gun is preferably composed of ceramic material, although other materials may be used. The separator 56 forms the hopper for the glass beads which have been cleaned and separated, inasmuch as the return duct 72 leads directly to the metering valve 76 and to the blasting gun 86.

The source of air is diagrammatically illustrated in FIGURE 9 at 92. It may include a pressure air tank. This source is connected by pipe 94 to the moisture filter 96 which, in turn, is connected by the pipe 98 to the air regulator 100. The air regulator is connected by a pipe 102 to the knee-control valve 104. When this valve is opened, air passes through pipe 106 to the blasting gun 86. The nozzle is provided with a venturi 108 of conventional design.

*Operation*

One or more of the pivoted sides 40 of the blasting cabinet 10 are opened to admit the article "A," which is held by the hands of the operator, as shown in FIGURE 5. After the pivoted sides are closed, the dry glass beads are withdrawn from the hopper by the venturi action to the blasting gun within the cabinet as controlled by the knee-control valve 104. With this valve open, the venturi action of the centuri 108 withdraws the glass beads from the hopper 56 through the fixture 70 to the gun, where they are projected under considerable force against the article "A" being treated. Because the blasting medium is borne in a high-velocity stream of air through the ceramic nozzle and against the workpiece, the surface produced differs, under microscopic tests, from polished and honed parts, in that said surface comprises a chemically pure, mat-satin-finished surface while retaining close tolerances. The action of the glass beads is substantially non-abrasive, as the beads are round and do not present rough edges to the workpiece.

It will be understood that the sizes of the glass beads used depend upon the coarseness, thickness and type of corrosive media, carbon deposits, rust, weld scale, burrs, or paint to be removed.

It will also be apparent, after the peening operation has been completed, that the metal surface is more compact than it was before treatment, and that most all porous portions of the metal surface have been eliminated. The present machine is adapted for the removal of carbon from pistons and valves of automobile engines, for removal of paint on various metal surfaces, for removal of weld scales from metal surfaces, for the deburring of threaded metal parts, for the removal of rust from various types of metal articles, and for the sealing of porosity in metals generally.

The above description and drawings disclose a single embodiment of the invention, and specific language has been employed in describing the several figures. It will be understood, however, that no limitations of the scope of the invention are thereby contemplated and that various alterations and modifications may be made such as would occur to one skilled in the art to which the invention relates.

We claim:

1. In a glass ball peening machine for treating small articles in combination, a cabinet, an air inlet for said cabinet, a blast gun within said cabinet, and means extending through the cabinet for holding the gun in position for peening metal objects, said cabinet having an opening for expended blasting materials at the base thereof, a conduit leading from said opening, a separator attached to said conduit, means in said separator for separating whole glass beads from chipped beads and extraneous matter, and means for returning whole glass beads to said cabinet.

2. The structure of claim 1, in which said separator includes a motor and a fan and means for regulating the amount of minus air pressure in said separator.

3. The structure of claim 1, wherein said separator further includes a cone-shaped element having a small outlet at the lower end thereof, a screen across said outlet, a fan and a motor located above said cone and a pipe extending from said fan adjacent the lower end of said cone.

4. The structure of claim 1, wherein said gun is provided with a venturi means, and means for regulating the amount of air supply to said gun.

5. A glass ball peening machine for treating small articles, comprising a cabinet having an opening at the top thereof for outside air, said cabinet having at least one pivoted side, a gun located in said cabinet, a venturi means in said gun, knee-control means for regulating the supply of air to said gun, means extending through the cabinet walls for supporting an object to be treated by the beads issuing from said gun, said cabinet having an outlet system at the base thereof, a reclaim unit connected to said outlet, said reclaim unit including a fan and motor driven thereby, means in said reclaim unit including said fan and motor for separating whole beads from damaged beads, conduit means for returning said whole beads to said gun, a metering valve in said conduit means for regulating the proportion of air bead mixture.

6. The structure of claim 5, wherein said last named means includes a cap and a plurality of different-sized holes in said cap.

7. The structure of claim 5, wherein said reclaim unit includes an inverted cone, a pipe extending substantially the length of said cone, a fan, said pipe being connected to the eye of said fan, an outlet from said fan to a bag, said reclaim unit having a screen extending across the end of said cone whereby whole beads pass through said screen.

8. The structure of claim 5, wherein said cabinet is provided with a lower front wall having openings for the arms of an operator, and an upper inclined front wall having an observation glass whereby the operator may observe the effect produced by the gun on a workpiece within said cabinet.

9. The structure of claim 5, wherein said cabinet is provided with a pair of arm openings for the support of a pair of sleeve members and gloves whereby to more readily support the gun in position for effective peening of a workpiece.

References Cited by the Examiner

UNITED STATES PATENTS

| | | | |
|---|---|---|---|
| 1,073,149 | 9/13 | Lawrence | 29—90.80 |
| 2,357,599 | 9/44 | Mott | 29—90.80 |
| 2,439,032 | 4/48 | Almen | 29—90.80 |
| 2,797,530 | 7/52 | Garver | 51—8 |
| 2,862,307 | 12/58 | Bloomer | 34—92 |
| 2,982,007 | 5/61 | Fuchs | 29—90.80 |

RICHARD H. EANES, JR., *Primary Examiner.*